US008219300B2

(12) United States Patent
Nagashima et al.

(10) Patent No.: US 8,219,300 B2
(45) Date of Patent: Jul. 10, 2012

(54) ENGINE CONTROL SYSTEM AND METHOD FOR CONTROLLING ENGINE AIR FLOW DURING DECELERATION FUEL CUT

(75) Inventors: Dan Nagashima, Dublin, OH (US); Paul DeHart, Urbana, OH (US); Hirokazu Toyoshima, Dublin, OH (US); Takahide Mizuno, Dublin, OH (US); Yoshiharu Saitou, Mashiko (JP); Yutaka Ishikawa, Utsunomiya (JP); Akio Muto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 739 days.

(21) Appl. No.: 12/421,750

(22) Filed: Apr. 10, 2009

(65) Prior Publication Data
US 2010/0262351 A1 Oct. 14, 2010

(51) Int. Cl.
*F02D 43/00* (2006.01)
*F02M 51/00* (2006.01)
*F02D 9/08* (2006.01)

(52) U.S. Cl. ........................ 701/102; 123/493
(58) Field of Classification Search .................. 701/102, 701/101, 115; 123/493, 198 F
See application file for complete search history.

(56) References Cited

U.S. PATENT DOCUMENTS

| 5,141,089 A | 8/1992 | Nobumoto et al. |
| 6,128,948 A * | 10/2000 | Shi et al. .................... 73/114.68 |
| 6,334,835 B1 * | 1/2002 | Tanaka et al. ................. 477/205 |
| 6,773,372 B2 | 8/2004 | Matsubara et al. |
| 6,979,280 B2 | 12/2005 | Oshima et al. |
| 7,252,620 B2 | 8/2007 | Kiuchi |

FOREIGN PATENT DOCUMENTS

| JP | 2000257483 A | * | 9/2000 |
| JP | 2004-251171 | | 9/2004 |
| JP | 2004308542 A | * | 11/2004 |

* cited by examiner

*Primary Examiner* — Hieu T Vo
(74) *Attorney, Agent, or Firm* — Rankin Hill & Clark LLP

(57) ABSTRACT

An engine control system and method for controlling engine air flow during a deceleration fuel cut includes an internal combustion engine, an anti-lock braking system (ABS), and an electronic control unit (ECU) that controls the engine. The ECU establishes a desired air flow rate for the internal combustion engine, which is taken from an ABS failed condition look-up table when determined that the ABS has failed while the engine is in a deceleration fuel cut mode, and otherwise is taken from a normal condition look-up table.

20 Claims, 6 Drawing Sheets

ENGINE CONTROL SYSTEM AND METHOD FOR CONTROLLING ENGINE AIR FLOW DURING DECELERATION FUEL CUT

BACKGROUND

The present disclosure relates generally to an engine control system and method, and particularly relates to a control system and method that controls engine air flow during a deceleration fuel cut.

It is known to cut fuel to an internal combustion engine during deceleration of the vehicle, e.g., sending a command signal to cease delivery of fuel to the combustion cylinders of the engine, where the command signal can be the vehicle's electronic control unit (ECU) directing one or more injector drivers to vary output voltage that drives one or more fuel injectors. In one conventional engine control system, the ECU controls intake air flow to the engine during such a fuel cut, such as by using drive-by-wire (DBW) throttle control. The purpose for controlling intake air flow during a deceleration fuel cut is to suppress blow-by gasses that would otherwise enter into the engine from the engine's crank case.

More particularly, with reference to FIG. 1, one cylinder 10 of a plurality of engine cylinders is schematically shown for internal combustion engine 12. During normal operation of the engine 12, the cylinder 10 receives combustion air through an intake port 14 from an upstream intake manifold 16. The combustion air delivered through the intake 14 combusts with fuel from fuel injector 17 in the cylinder 10 to move cylinder piston 18 in a known manner. Exhaust gases from the combustion process in the cylinder 10 are directed through an exhaust port 20 and ultimately through an exhaust manifold 22 operatively connected to the engine 12.

When fuel is cut during engine deceleration, no combustion occurs in the cylinder 10. In this state, the engine 12 acts solely as a pump. If left unchecked, a negative pressure situation can occur in the cylinder 10 leading to blow-by gases 24 entering the cylinder 10 from the crank case 26. This can be remedied by controlling intake air flow 28 into the engine 12 by controlling throttle 30. In particular, throttle valve 32 of the throttle 30 is controlled by a throttle controller 34 which receives command signals from ECU 36. Specifically, the amount of air flow let into the engine 12 by the throttle 30 is used to control the vacuum in the intake system, particularly in the cylinders of the engine 12, such as cylinder 10. That is, the throttle valve 32 is opened to create a positive pressure situation within the cylinder 10 to limit blow-by gases from venturing into the engine 12 from the crank case 26.

The amount of air flow 28 let into the engine 12 by the throttle valve 32 has a direct relationship to the amount of blow-by oil 24 that escapes from the crank case 26 and enters into the combustion chamber of the cylinder 10. Prior art engine control systems use a pre-calibrated table to look up how much air flow to allow into the engine 12 by the throttle 30 based on engine speed. For monitoring engine speed, an engine speed sensor 38 is typically provided on the engine's output shaft 40. Thus, the ECU 36 looks up the desired air flow to be delivered into the engine 12, and to the cylinders of the engine 12 (e.g., cylinder 10), to find the desired amount of air flow necessary to sufficiently limit blow-by gases from entering into the engine 12 based on a particular engine speed. The ECU 36 converts the looked-up desired air flow amount to a throttle angle for the throttle 30 and outputs a command signal to the throttle controller 34, which in turn adjusts the position of the throttle valve 32 accordingly.

SUMMARY

According to one aspect, an engine control method is provided for controlling engine air flow during a deceleration fuel cut. More particularly, in accordance with this aspect, a determination is made as to whether an internal combustion engine is in a deceleration fuel cut mode. Next, a determination is made as to whether an anti-lock braking system (ABS) has failed when determined that the internal combustion engine is in the deceleration fuel cut mode. When determined that the ABS has failed and the internal combustion engine is in the deceleration fuel cut mode, a desired air flow rate for the internal combustion engine is looked up from an ABS failed condition look-up table based on engine speed of the internal combustion engine.

According to another aspect, an engine control system is provided for controlling engine air flow during a deceleration fuel cut. More particularly, in accordance with this aspect, the engine control system includes an internal combustion engine for producing power to be transmitted to wheels of a vehicle and an anti-lock braking system (ABS) operatively connected to the wheels for rapid controlled deceleration of the vehicle. An electronic control unit (ECU) is operatively linked to the internal combustion engine for control thereof. The ECU has a deceleration fuel cut mode wherein a fuel cut command is sent to cut fuel delivery to the internal combustion engine. The ECU is configured to determine whether the ABS has failed when in the deceleration fuel cut mode, and is further configured to look up a desired air flow rate for the internal combustion engine from an ABS failed condition look-up table when determined that the ABS has failed while the ECU is in the deceleration fuel cut mode.

According to yet another aspect, a throttle control method is provided for controlling engine air flow in a vehicle during a deceleration fuel cut. More particularly, in accordance with this aspect, the vehicle is decelerated and a deceleration fuel cut mode is initiated to cut fuel to an internal combustion engine during deceleration of the vehicle. A desired air flow rate for the internal combustion engine is established. The desired air flow rate is taken from an ABS failed condition look-up table when determined that an anti-locking braking system (ABS) has failed while in the deceleration fuel cut mode and otherwise is taken from a normal condition look-up table.

DETAILED DESCRIPTION

Figure 1:
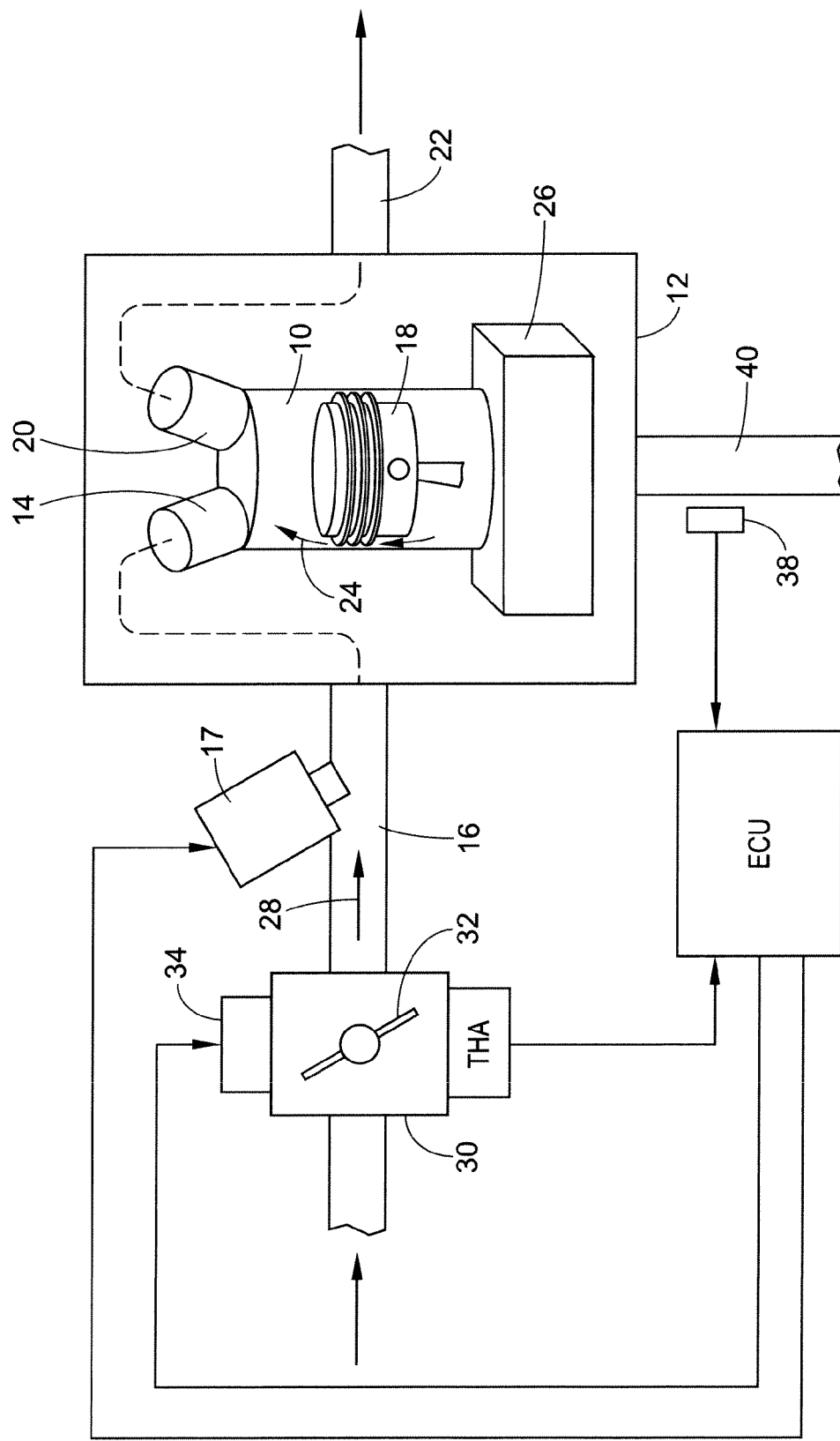
FIG. 1 schematically illustrates a prior art control system for limiting blow-by gases from entering an engine during a deceleration fuel cut by controlling throttle position.
Figure 2:
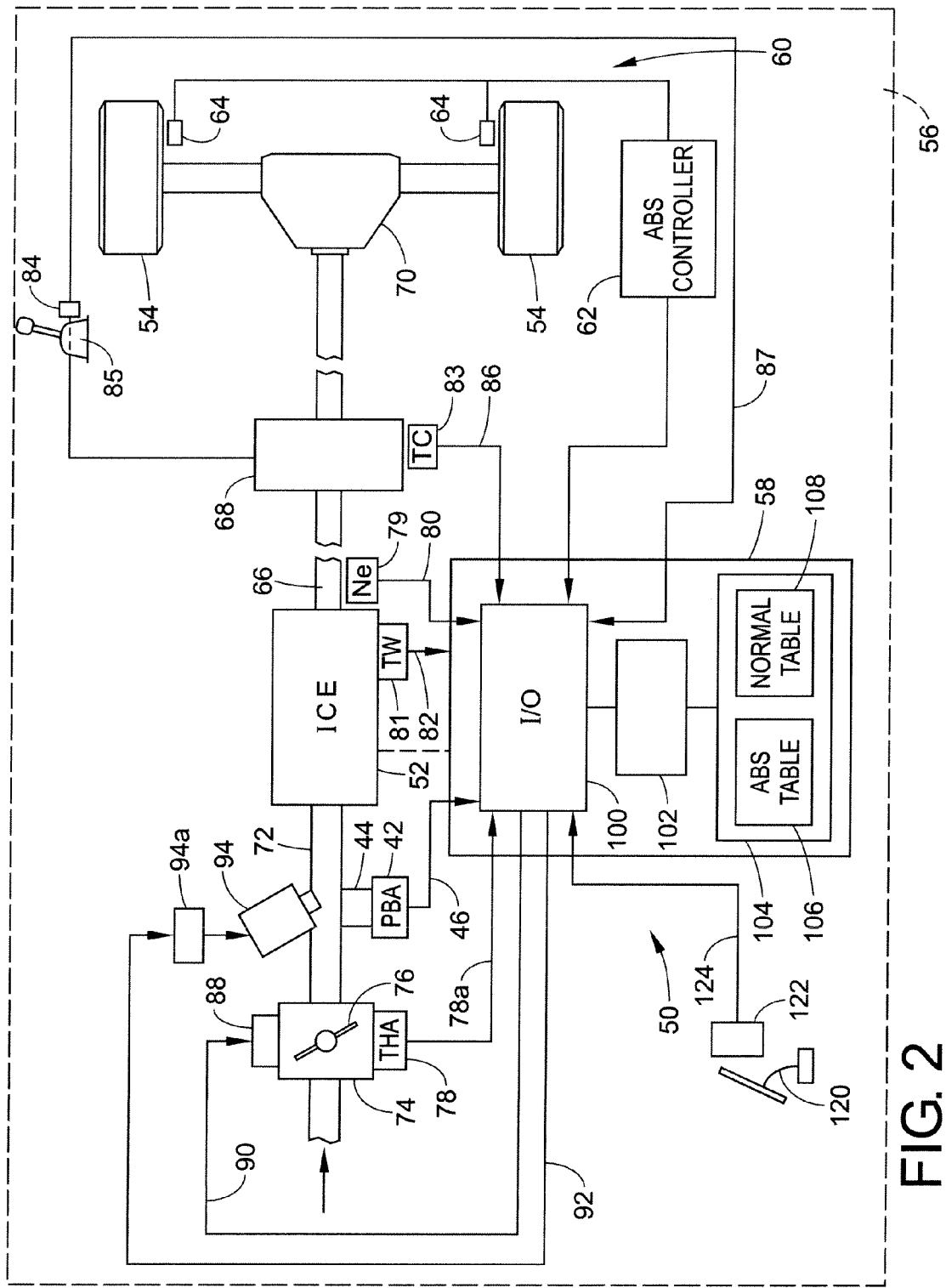
FIG. 2 schematically illustrates an improved engine control system for controlling engine air flow during a deceleration fuel cut based on an anti-lock brake system (ABS) failure condition.

Referring now to the drawings, wherein the showings are only for purposes of illustrating one or more exemplary embodiments, FIG. 2 schematically illustrates an engine control system 50 for controlling engine air flow into an internal combustion engine 52 during a deceleration fuel cut. Of course, as will be understood and appreciated by those skilled in the art, the engine 52 can be a V-type DOHC gasoline engine or some other type of engine, and/or can have any number of cylinders while still advantageously incorporating the features of the present disclosure. As is conventional, the engine 52 produces power to be transmitted to wheels 54 of a vehicle 56. In particular, power from the engine 52 is transmitted to the wheels 54 through an engine output shaft 66 connected through a transmission 68 (manual or automatic) and optionally a differential 70. Thus, the transmission 68 operatively interconnects the engine 52 and the wheels 54 to transmit power from the engine 52 to the wheels 54.

The system 50 can additionally include an electronic control unit (ECU) 58 operatively linked to the engine 52 for control thereof, and can include an anti-lock braking system (ABS) 60 for rapid controlled deceleration of the vehicle 56 as is known and understood by those skilled in the art. The ABS 60 can comprise an ABS controller 62 operatively connected to braking devices 64 disposed respectively at the wheels 54 for control thereof. Fuel delivery to the engine 52 is controlled by the ECU 58. In particular, the ECU 58 sends a command signal or signals 92, which cause fuel injectors 94 (only one shown in FIG. 2) to cut or cease delivery of fuel to the engine 52. More specifically, in one exemplary embodiment, the ECU 58 directs an injector driver 94a to vary an output voltage that normally drives the fuel injector 94 and thereby cuts fuel to the engine 52.

Intake manifold 72 is operatively connected to the engine 52 for delivering combustion air. A throttle or throttle body 74 is provided upstream of the intake manifold 72 for controlling air flow delivered to the engine 52. In this manner, the throttle body 74 is operatively connected to the engine 52. A throttle valve 76 can be rotatably disposed within the throttle body 74 for regulating air flow into the engine 52 as the throttle valve 76 is angularly moved. A degree of opening of the throttle valve 76 can be sensed by a throttle valve opening sensor 78 and communicated as a signal 78a indicative of the sensed throttle valve opening amount (TVA) to the ECU 58 via a link therewith. A throttle body controller 88 is operatively connected to the throttle body 74 and the throttle valve 76. The throttle body controller 88 is linked to the ECU 58 for receiving an open command signal 90 therefrom. The throttle body controller 88 is configured to move the throttle valve 76 to a desired position based on the command signal 90 received from the ECU 58. As used herein, a link or being linked is being used broadly to cover any operative connection between components of the system 50 whether wired or wireless that enables the linked components to communicate (e.g., transmit a signal from one component to another).

The system 50 can additionally employ one or more further sensors for sensing various operating conditions of the engine 52 and communicating the sensed conditions as signals to the ECU 58. For example, an engine speed (Ne) sensor 79 can be disposed on or adjacent the engine output shaft 66 for measuring engine speed (Ne) by monitoring rotation of the engine output shaft 66. The sensor 79 can be linked to the ECU 58 so the measured engine speed (Ne) can be communicated as a signal 80 indicative of the engine speed. An intake pipe absolute pressure (PBA) sensor 42 is provided in communication with the interior of the intake pipe 72 at a location immediately downstream of the throttle valve 76 through a conduit 44. The PBA sensor 42 can sense or measure absolute pressure (PBA) in the intake pipe 72 and communicate a signal 46 indicative of the measured absolute pressure (PBA) to the ECU 58 via a link therewith. An engine coolant temperature (TW) sensor 81, which may be formed of a thermistor or the like, can mounted in the cylinder block of the engine 52 filled with an engine coolant. The sensor 81 can sense or measure engine coolant temperature and communicate a signal 82 indicative of the measured temperature TW to the ECU 58 via a link therewith.

One or both additional sensors 83, 84 can be provided for monitoring a condition of the transmission 68 and/or a position of a shift lever 85 operatively connected to the transmission 68. More particularly, transmission sensor 83 can be disposed in or adjacent the transmission 68 for monitoring a condition of a transmission 68 and communicating a signal 86 representative thereof. Similarly, shift lever sensor 84 can be provided within or adjacent the shift lever or shift lever assembly 85 for monitoring a position thereof and communicating a signal 87 to the ECU 58 via a link therewith. Accordingly, one or both of the sensors 83, 84 can monitor the transmission 68 and/or the shift lever 85 to determine a gear position of the transmission 68, or at least an expected position of the transmission 68. An accelerator pedal position sensor 120 can be provided to sense or monitor the position of an accelerator pedal 122 of the vehicle 56. The position can be communicated to the ECU 58 as a signal 124 via a link with the ECU 58. Alternatively, the sensor 120 can send signal 124 only to indicate that the accelerator pedal 120 is open (i.e., not depressed).

The ECU 58 can include an input/output (I/O) interface 100 for sending and receiving signals with the various components of the system 50, including controllers (e.g., ABS controller 62 and throttle controller 88), sensors (THA sensor 78, transmission sensor 83, shift lever sensor 84, and engine speed sensor 79), the fuel injectors 94 or injector drivers 94a, etc. Although not illustrated, the I/O interface 100 can include an input circuit having various functions including a function of shaping the waveforms of input signals from the various sensors, a function of correcting the voltage levels of the input signals to a predetermined level, and a function of converting analog signal values into digital signal values. The I/O interface 100 can also include an output circuit for supplying drive signals to various components of the system, such as the fuel injection valves 94 or the drivers 94a therefor, etc., and the controllers 88 and 62. The ECU 58 can additionally include a central processing unit (CPU) 102 linked to the I/O interface 100 and linked to a memory or memory circuit 104 including a ROM, which can preliminarily store various operational programs to be executed by the CPU 102, and a RAM (random access memory) for storing the results of computations or the like by the CPU 102. The ECU 58, and particularly the memory 104 thereof, can include an ABS failed condition look-up table 106 and a normal condition look-up table 108, which will be described in further detail below.

Figure 6:
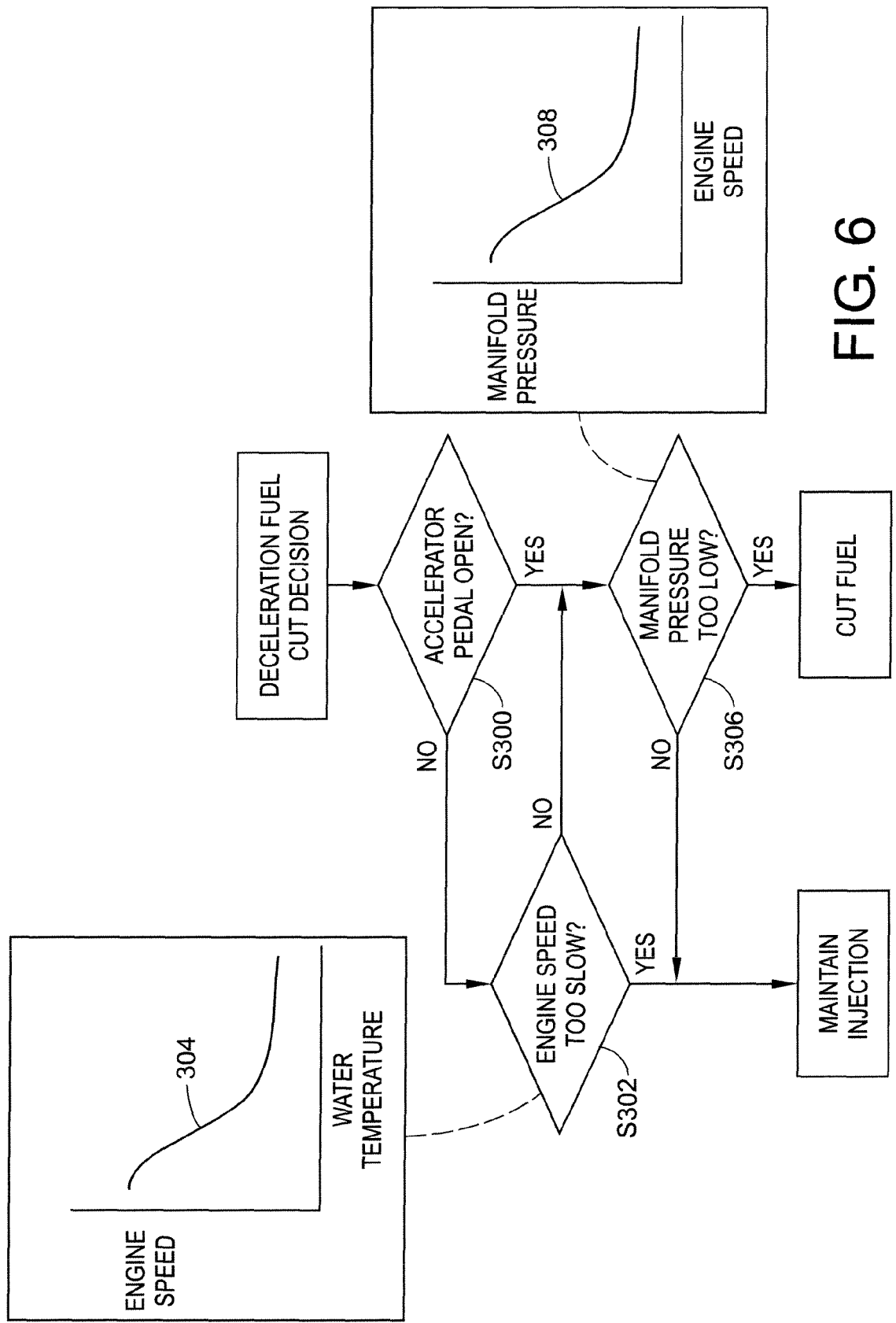
FIG. 6 is a block diagram showing a deceleration fuel cut decision process for determining when to enter a fuel cut mode.

As is conventionally known, the ECU 58 can have a deceleration fuel cut mode wherein a fuel cut command sent as signal 92 can be sent to cut fuel delivery to the engine 52. More particularly, with additional reference to FIG. 6, a deceleration fuel cut decision process is shown according to one exemplary embodiment for determining when to enter a fuel cut mode. In S300, a determination is made as to whether the accelerator pedal 120 is open. This can be determined by the ECU 58 based on the signal 124 sent from the accelerator pedal sensor 122. If the accelerator pedal 120 is open as determined by sensor 122, a determination is made as to whether engine speed Ne of engine 52 is too low in S302. Engine speed can be monitored or measured by sensor 79 and communicated back to the ECU 58 as signal 80 as already described hereinabove. Determining whether engine speed is too low can involve determining whether engine speed is above or below a predefined water temperature versus engine speed curve. One exemplary such curve is shown at 304. The determination can be made by the ECU 58, which receives engine speed signal 80 indicative of the engine speed Ne of engine 52 and the temperature signal 82 indicative of the water or coolant temperature TW of the engine 52. The curve 304, or some other suitable curve, can be stored in the ECU memory 104 as is known and understood by those skilled in the art.

If engine speed is too low in S302 (e.g., engine speed Ne is less than a threshold amount at a particular water temperature TW), the deceleration fuel cut decision process ends and fuel injection is maintained. If engine speed is not too low in S302 (e.g., engine speed Ne is greater than a threshold amount at a particular water temperature TW), a determination is made as to whether manifold pressure PBA is too low in S306. Manifold pressure can be monitored or measured by sensor 42 and communicated to the ECU 58 as signal 46 as already described hereinabove. Determining whether manifold pressure is too low can involve determining whether manifold pressure PBA is above or below a predefined engine speed versus manifold pressure curve. One such exemplary curve is shown at 308.

The determination at S306 can be made by the ECU 58, which receives engine speed signal 80 indicative of the engine speed Ne of the engine 52 and manifold pressure signal 46 indicative of manifold pressure PBA. The curve 308, or some other suitable curve, can be stored in the ECU memory as is known and understood by those skilled in the art. If the manifold pressure is too low in S306 (e.g., manifold pressure PBA is less than a threshold amount at a particular engine speed Ne), then the fuel cut mode is entered or activated. For example, the ECU 58 can direct fuel injector drivers 94a to vary output voltage such that fuel delivery by the fuel injectors 94 ceases. Alternatively, if manifold pressure is not too low in S306 (e.g., manifold pressure PBA is greater than a threshold amount at a particular engine speed Ne), then the deceleration fuel cut decision process ends and fuel injection is maintained (i.e., no fuel cut mode is entered).

As will be described in more detail below, the ECU 58 can be configured to determine whether the ABS 60 has failed when in the deceleration fuel cut mode. The ECU 58 can be further configured to look-up the desired air flow rate for the engine 52 from the ABS failed condition look-up table 106 when determined that the ABS 60 has failed while the ECU 58 is in the deceleration fuel cut mode. The desired air flow rate from the ABS failed condition look-up table 106 corresponds to the engine speed Ne of the engine 52 and is sufficient to prevent the engine 52 from stalling during the deceleration, while simultaneously preventing or limiting blow-by gases from passing into the combustion chambers of the cylinders of the engine 52. In particular, the ECU 58 can look up a desired air flow rate from the ABS table 106 that corresponds to the engine speed Ne as indicated by the sensor 79.

The ECU 58 is also configured to alternatively look up the desired air flow rate from the normal condition look-up table 108 when no determination is made that the ABS 60 has failed. In general, the air flow rates of the ABS failed condition look-up table 106 are higher for a given engine speed Ne than those of the normal condition look-up table 108. Whether the desired air flow rate is determined from the ABS look-up table 106 or the normal look-up table 108, the ECU 58 can convert the looked up desired air flow rate to a throttle body open angle for the throttle valve 76 and can command, via command signal 90, the throttle valve 76 to move to the throttle body open angle corresponding to the desired air flow rate. In particular, the ECU 58 can send a throttle body open angle command signal 90 to the throttle body controller 88 and the throttle body controller 88 can move the throttle valve 76 to the specified throttle body open angle.

In an alternate configuration, the ECU 58 can also be configured to determine whether the transmission 68 meets a desired condition after determining that the ABS 60 has failed when in the deceleration fuel cut mode. In this alternate configuration, the ECU 58 looks up the desired air flow rate from the ABS failed condition look-up table 106 only when determined that the ABS 60 has failed while the ECU 58 is in the deceleration fuel cut mode and when determined that the transmission meets the desired condition. By way of example, the desired condition can be set so as to be met when a gear position of the transmission indicates that the transmission 68 is engaged with the output shaft 66 of the engine 52. This can be determined by one or both of the sensors 83, 84. For example, sensor 83 could specify that the transmission 68 is in a particular gear position and/or sensor 84 can indicate that the gear lever 85 is in a particular position corresponding to a selected position of the transmission 68.

Figure 3:
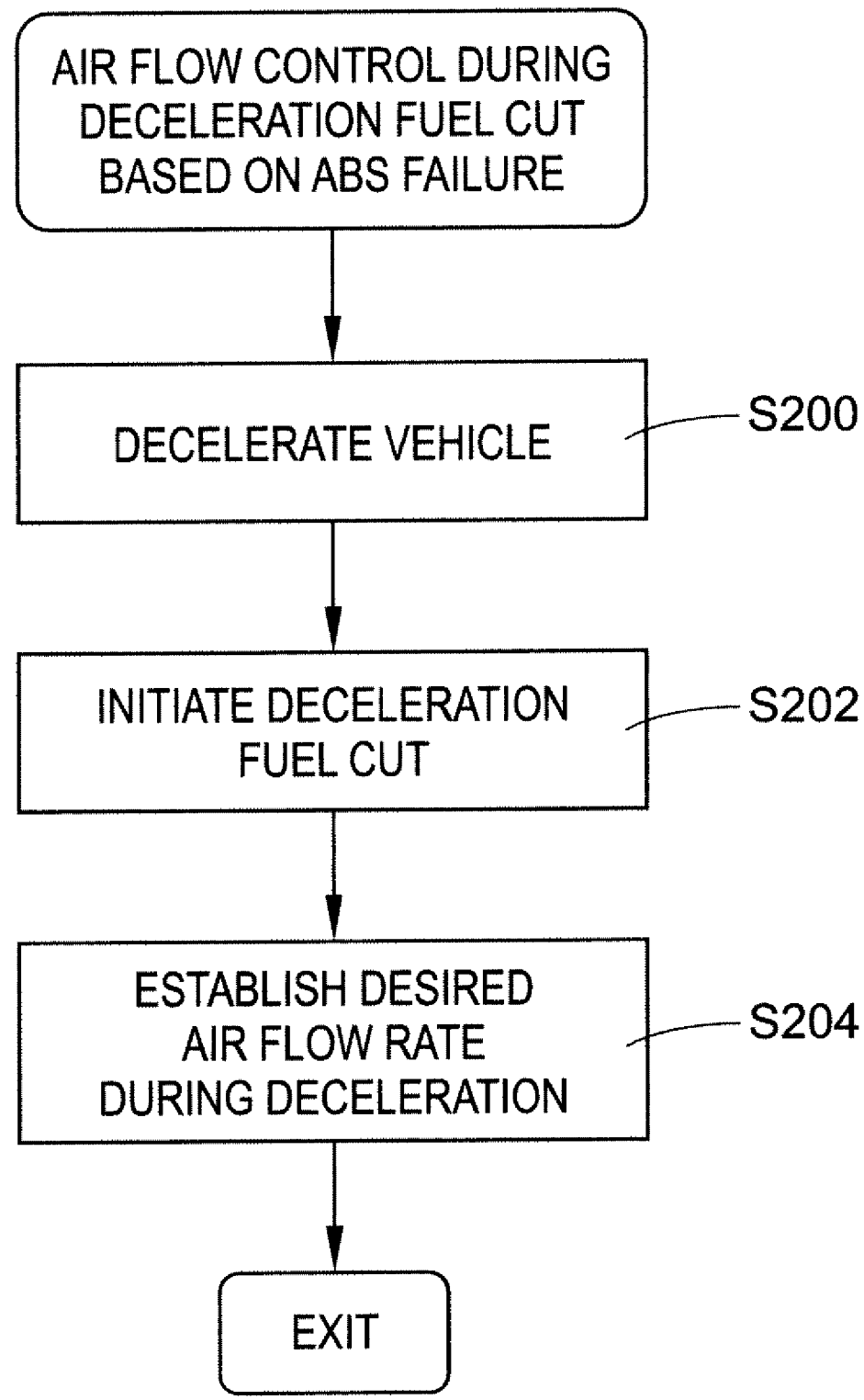
FIG. 3 is a block diagram showing an air flow control process for controlling air flow during a deceleration fuel cut based on ABS failure.

Turning to FIG. 3, an air flow control method is schematically illustrated for controlling air flow to the engine 52 during a deceleration fuel cut based on whether failure of the ABS 60 has occurred. As shown, the method begins when the vehicle 56 decelerates in S200. During the deceleration of S200, a deceleration fuel cut mode is initiated (such as through the process of FIG. 6) wherein fuel is cut to the engine 52 in S202. As already described herein, this can include the ECU 58 sending a cut command signal 92 to the fuel injector drivers 94a. When fuel is cut during deceleration or in the deceleration fuel cut mode in S202, a desired air flow rate can be established for the engine 52 at S204. As already described, this desired air flow rate can correspond to engine speed Ne of the engine 52. The desired air flow rate is taken from the ABS failed condition look-up table 106 when determined that the ABS 60 has failed while in the deceleration fuel cut mode and is otherwise taken from the normal condition lookup table 108. In general, the desired air flow rate is higher for a given engine speed Ne when taken from the ABS failed condition look-up table 106 than when taken from the normal condition look-up table 108. Optionally, the desired air flow rate can be taken from the ABS failed condition look-up table 106 only when determined that the ABS 60 has failed and the transmission 68 is in a particular gear position, otherwise the desired air flow rate can be taken from the normal condition look-up table 108. For this option, a determination is made as to whether the transmission 68 associated with the engine 52 is in a particular gear position. In any case, whether the desired air flow rate is taken from the ABS failed condition table 106 or the normal condition table 108, the looked-up desired air flow rate can be converted to a throttle body open angle and the throttle, which regulates air flow to the engine 52, can be commanded via signal 92 to the throttle body open angle.

Figure 4:
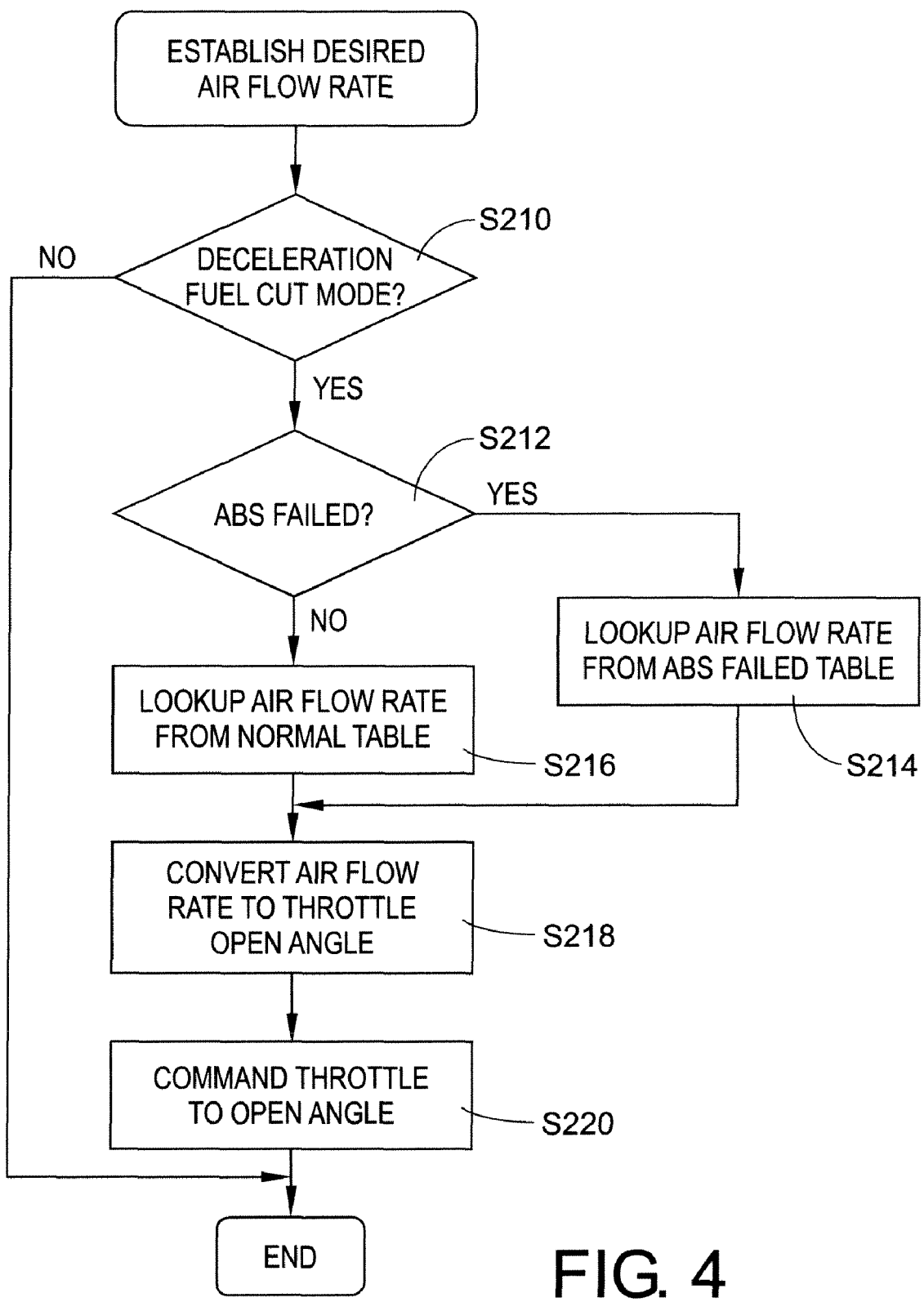
FIG. 4 is a block diagram showing a process for establishing a desired air flow rate for an engine.

With reference to FIG. 4, a method for establishing a desired air flow rate to the engine 52 is shown and can be used when establishing a desired air flow rate in S204 from FIG. 3, if desired. More particularly, in S210 it is determined whether the internal combustion engine 52 is in the deceleration fuel cut mode where fuel is cut to the engine 52. If not in the deceleration fuel cut mode in S210, the process ends; however, if determined that the engine 52 is in the deceleration fuel cut mode in S210, it is determined whether the ABS 60 has failed in S212. When determined that the ABS has failed in S212 and the engine 52 is determined to be in the deceleration fuel cut mode in S210, a desired air flow rate for the engine 52 is looked up in the ABS failed condition look-up table 106, which provides desired air flow rates based on the engine speed Ne of the engine 52 as determined by sensor 79 in S214. When no determination is made that the ABS 60 has failed (i.e., the ABS 60 has not been determined as failing) in S212, the desired air flow rate for the engine 52 is looked up from the normal condition look-up table 108, which also provides desired air flow rates based on the engine speed of the engine 52 as determined by the engine speed sensor 79, in S216. As already indicated herein, the air flow rates in the ABS failed condition look-up table 106 are generally higher for a given engine speed than the air flow rates in the normal condition look-up table 108.

Whether the desired air flow rate is looked up from the ABS failed condition look-up table 106 or the normal condition look-up table 108, the looked-up air flow rate is converted to a throttle body open angle in S218. The ECU 58 then commands the throttle 74 to the throttle body open angle in S220. Commanding the throttle 74 to the throttle body open angle includes communicating signal 92 to the throttle body controller 88 that moves the throttle 74, and particularly the throttle valve 76, to the throttle body open angle of S218. When the air flow rates and corresponding throttle body open angles that are looked-up from the ABS failed condition table, a higher rate of air flow into the engine 52 is commanded as corresponds to the desired air flow rate that reduces a likelihood of the engine 52 stalling, a condition otherwise potentially occurring when the engine 52 is in a deceleration fuel cut mode and the ABS 60 has failed. More specifically, when the ABS 60 has failed, the tires 54 of the vehicle 56 may lock up. In this situation, and when the vehicle 56 is quickly decelerating towards a stop, this can cause the engine 52 to stall. Using the ABS failed condition look-up table countermeasures this situation by limiting the rate of deceleration of the vehicle 56 by commanding a higher air flow into the engine 52 when the ABS 60 has failed. In particular, the method depicted in FIG. 4 uses a second look-up table (i.e., the ABS failed condition look-up table 106) for looking up values for commanding throttle body air flow when the ABS 60 has failed that are generally higher to prevent engine stalling.

Figure 5:
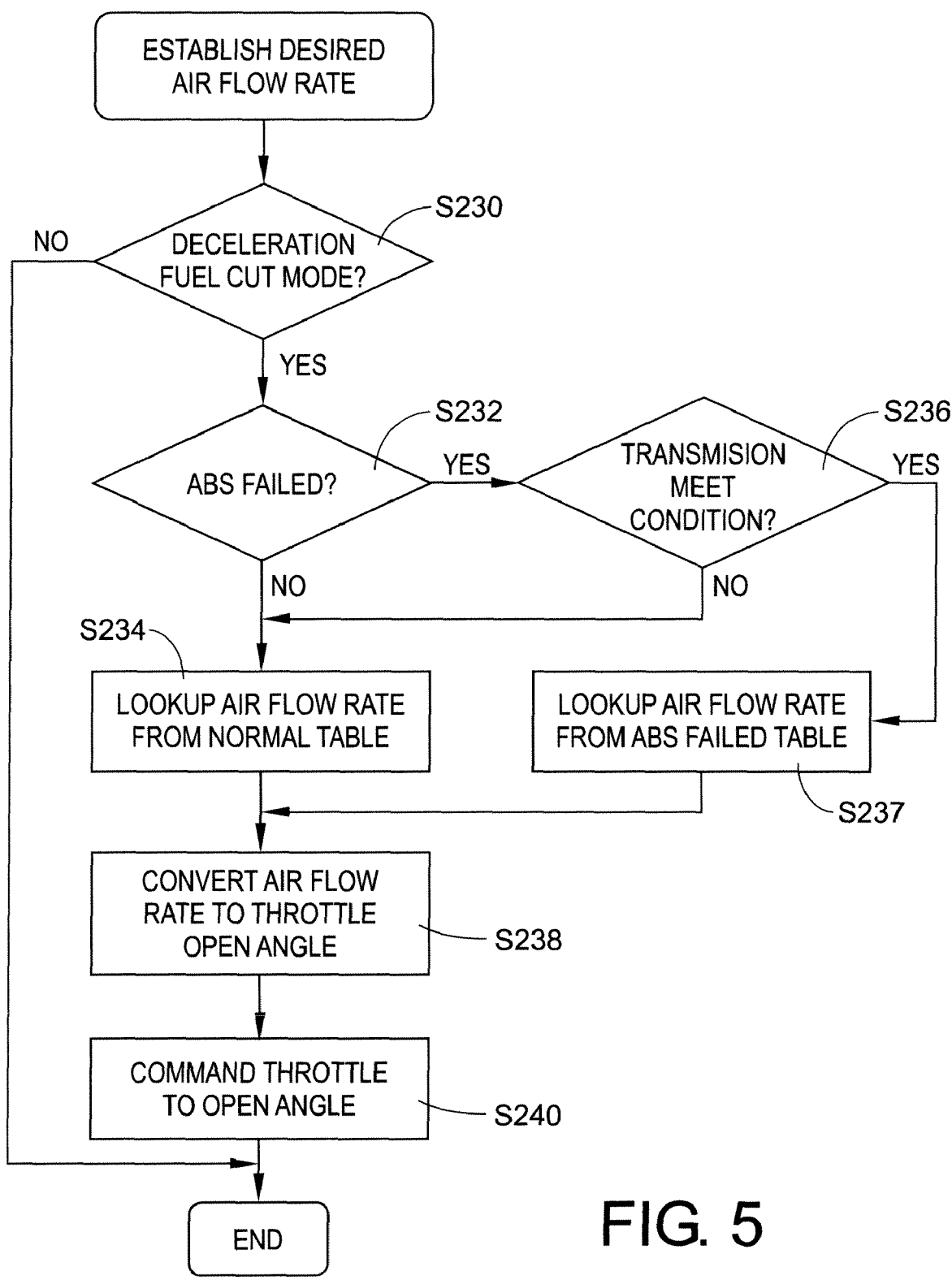
FIG. 5 is a block diagram showing an alternate process for establishing a desired air flow rate for an engine.

With reference to FIG. 5, another method for establishing a desired air flow rate is illustrated, and can be applied at S204 from FIG. 3 if desired. The method or process of FIG. 5 is similar to that of FIG. 4, but only uses the ABS failed condition look-up table 106 when the vehicle 56, and particularly the transmission 68, is determined to meet a specified condition, e.g., being in one or more specified gear positions. Like S210, whether the engine 52 is in the deceleration fuel cut mode is determined in S230. If no, the process ends; if yes, it is determined whether the ABS 60 has failed in S232. If the ABS 60 has not failed (or at least no determination that the ABS 60 is in a failed condition has been made), the desired air flow rate for the engine 52 is looked up from the normal condition table 108 in S234.

On the other hand, and unlike the process of FIG. 4, if determined that the ABS 60 has failed in S232, it is next determined whether the transmission 68 meets a desired condition in S236. In one embodiment, the desired condition can correspond to the transmission 68 being engaged with the output shaft 66 of the engine 52. This can be indicated, for example, by one or both: the transmission sensor 83 indicating that the transmission 68 is engaged with the output shaft 66 and/or the shift lever sensor 84 indicating that a position of the shift lever 85 is such that it is expected that the transmission 68 is in a gear in which the transmission 68 is engaged with an output shaft 66 of the engine 52.

When no such determination is made in S236, the desired air flow rate is looked up from the normal condition look-up table 108; when the condition is met (e.g., the transmission 68 is engaged with the output shaft 66 of the engine 52), the desired air flow rate is looked up from the ABS failed condition 106 in S236. Thus, in the process of FIG. 5, the desired air flow rate is looked up from the ABS failed condition look-up table 106 only when determined that the transmission 68 meets the desired condition (e.g., the transmission 68 being engaged with the output shaft 66 of the engine 52). Next, whether the desired air flow rate is looked up from the ABS failed condition look-up table 106 or the normal condition look-up table 108, the desired air flow rate is converted to a throttle body open angle in S238. This can be the same as described in reference to S218 of FIG. 4. Then the throttle 74 of the engine 52 can be commanded to open the throttle valve 76 to the throttle body open angle in S240, which can be the same as described in reference to S220 of FIG. 4.

The process shown in FIG. 5 countermeasures a situation where the ABS 60 has failed (which could cause the tires to lock up), the transmission 68 is engaged and the vehicle 56 is decelerating towards a stop. Unchecked, this could cause the engine 52 to stall because the road is braking the engine 52. By using the ABS failed condition look-up table 106 instead of the normal look-up table 108, deceleration of the vehicle 56 is limited by commanding higher air flow rates into the engine 52 for given engine speeds, which limits the rate of deceleration of the vehicle 56.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An engine control system for controlling engine air flow during a deceleration fuel cut, said engine control system comprising:
    an internal combustion engine for producing power to be transmitted to wheels of a vehicle;
    an anti-lock braking system (ABS) operatively connected to said wheels for rapid controlled deceleration of said vehicle; and
    an electronic control unit (ECU) operatively linked to said internal combustion engine for control thereof, said ECU having a deceleration fuel cut mode wherein a fuel cut command is sent to cut fuel delivery to said internal combustion engine, said ECU configured to determine whether said ABS has failed when in said deceleration fuel cut mode, and further configured to lookup a desired air flow rate for said internal combustion engine from an ABS failed condition lookup table when determined that said ABS has failed while said ECU is in said deceleration fuel cut mode.

2. The engine control system of claim 1 wherein said desired air flow rate from said ABS failed condition lookup table corresponds to engine speed of said internal combustion engine and being sufficient to prevent said internal combustion engine from stalling.

3. The engine control system of claim 1 wherein said ECU is also configured to lookup said desired air flow rate from a normal condition lookup table when no determination is made that said ABS has failed, said air flow rates of said ABS failed condition lookup table higher for a given engine speed than those of said normal condition lookup table.

4. The engine control system of claim 1 further including:
a transmission operatively interconnecting said internal combustion engine and said wheels to transmit power from said internal combustion engine to said wheels, wherein said ECU is also configured to determine whether said transmission meets a desired condition after determining that said ABS has failed when in said deceleration fuel cut mode, said ECU looking up said desired air flow rate from said ABS failed condition lookup table only when determined that said ABS has failed while said ECU is in said deceleration fuel cut mode and when determined that said gear transmission said desired condition.

5. The engine control system of claim 4 wherein said transmission has a gear position, said desired condition is met when said gear position indicates that said transmission is engaged with an output shaft of said internal combustion engine.

6. The engine control system of claim 1 further including a throttle body operatively connected to said internal combustion engine and having a throttle valve angularly movable for controlling air flow delivery to said internal combustion engine, said ECU converting said desired air flow rate looked up from said ABS failed condition lookup table to a throttle body open angle for said throttle valve and commanding said throttle valve to move to said throttle body open angle.

7. The engine control system of claim 6 further including a throttle body controller operatively connected to said throttle body and said throttle valve, said ECU sending a throttle body open angle command signal to said throttle body controller and said throttle body controller moving said throttle valve to said throttle body open angle.

8. An engine control method for controlling engine air flow during a deceleration fuel cut, comprising:
determining whether an internal combustion engine is in a deceleration fuel cut mode;
determining whether an anti-lock braking system (ABS) has failed when determined that said internal combustion engine is in said declaration fuel cut mode; and
looking up a desired air flow rate for said internal combustion engine from an ABS failed condition lookup table based on engine speed of said internal combustion engine when determined that said ABS has failed and said internal combustion engine is in said deceleration fuel cut mode.

9. The engine control method of claim 8 further including:
converting said desired air flow rate looked up from said ABS failed condition lookup table to a throttle body open angle; and
commanding a throttle of said internal combustion engine to said throttle body open angle.

10. The engine control method of claim 9 wherein commanding said throttle to said throttle body open angle includes communicating a signal to a throttle body controller that moves said throttle to said throttle body open angle.

11. The engine control method of claim 8 further including:
looking up a desired air flow rate for said internal combustion engine from a normal condition lookup table based on engine speed of said internal combustion engine when no determination is made that said ABS has failed.

12. The engine control method of claim 11 wherein air flow rates in said ABS failed condition lookup table are higher for given engine speeds than air flow rates in said normal condition lookup table.

13. The engine control method of claim 8 further including:
determining whether a transmission meets a desired condition when determined that said ABS has failed, wherein looking up desired air flow from said ABS failed condition lookup table only occurs when determined that said transmission meets said desired condition.

14. The engine control method of claim 13 wherein said transmission is operatively connected to said internal combustion engine, and is engaged with an output shaft of said internal combustion engine.

15. The engine control method of claim 8 further including:
commanding a higher rate of air flow into said internal combustion engine corresponding to said desired air flow rate for reducing a likelihood of said internal combustion engine stalling.

16. A throttle control method for controlling engine air flow in a vehicle during a deceleration fuel cut, comprising:
a) decelerating the vehicle;
b) initiating a deceleration fuel cut mode to cut fuel to an internal combustion engine during deceleration of the vehicle in step a);
c) establishing a desired air flow rate for said internal combustion engine, said desired air flow rate taken from an ABS failed condition lookup table when determined that an anti-locking braking system (ABS) has failed while in said deceleration fuel cut mode at step b) and otherwise taken from a normal condition lookup table.

17. The method of claim 16 wherein said desired air flow rate corresponds to an engine speed of said internal combustion engine.

18. The method of claim 16 wherein establishing said desired air flow rate includes:
determining whether a transmission associated with said internal combustion engine is in a particular gear position, wherein said desired air flow rate is taken from said ABS failed condition lookup table only when determined that said ABS has failed in step b) and said transmission is in said particular gear position.

19. The method of claim 16 wherein establishing said desired air flow rate includes:
converting said desired air flow rate to a throttle body open angle; and
commanding a throttle regulating air flow to said internal combustion engine to said throttle body open angle.

20. The method of claim 16 wherein said desired air flow rate is higher for a given engine speed when taken from said ABS failed condition lookup table than when taken from said normal condition lookup table.

* * * * *